United States Patent [19]

Doidge et al.

[11] Patent Number: 4,743,305

[45] Date of Patent: * May 10, 1988

[54] ORGANOCLAYS

[75] Inventors: Neil T. Doidge, Gonzales, Tex.; Howard Goodman; Andrew R. Fugler, both of St. Austell, United Kingdom

[73] Assignee: ECC International Limited, Great Britain

[ * ] Notice: The portion of the term of this patent subsequent to Nov. 18, 2003 has been disclaimed.

[21] Appl. No.: 930,279

[22] Filed: Nov. 12, 1986

Related U.S. Application Data

[63] Continuation-in-part of Ser. No. 727,022, Apr. 25, 1985, Pat. No. 4,623,398.

[51] Int. Cl.$^4$ .................. C04B 14/00; C04B 33/00
[52] U.S. Cl. ......................... 106/308 N; 106/309; 501/145; 501/148; 501/149

[58] Field of Search ............ 106/308 N, 287.25; 252/315.5, 315.6; 501/147

[56] References Cited

U.S. PATENT DOCUMENTS 4,412,018 10/1983 Finlayson et al. ............ 106/287.25
4,623,398 11/1986 Goodman et al. ................ 501/148

Primary Examiner—Theodore Morris
Attorney, Agent, or Firm—Stefan J. Klauber

[57] ABSTRACT

An organoclay is prepared by mixing a quaternary ammonium compound with an aqueous suspension of a smectite clay in proportions such that there are present from 75 to 110 milliequivalents of quaternary ammonium cation per 100 g of dry smectite clay, thereafter subjecting the smectite clay/quaternary ammonium compound/water mixture to high shear mixing for a time sufficient to dissipate in the mixture at least 100 KJ of energy per kg. of dry solids in the mixture; and then dewatering the product thus obtained.

9 Claims, 2 Drawing Sheets

ORGANOCLAYS

This application is a continuation-in-part of U.S. Ser. No. 727,022, filed Apr. 25, 1985 now U.S. Pat. No. 4,623,398.

BACKGROUND OF THE INVENTION

This invention relates to a process for preparing organoclays and to the products of such a process.

An organoclay is an organophilic cation-modified clay derived from a clay mineral, generally of the smectite group, for example, bentonite, montmorillonite, hectorite, saponite or the like, by replacing the inorganic exchangeable cations, generally alkali or alkaline earth metal cations, which occur in the natural clay mineral, by organic cations each comprising at least one hydrocarbon radical which has sufficient carbon atoms to render the surface of the cation-exchanged clay hydrophobic.

Organoclays have been found to be very useful as thixotropic agents in organic media such as, for example, lubricating greases, oil-based drilling fluids, paints, varnishes, enamels and printing inks. However, an organoclay is, in general, difficult to disperse in an organic medium to form the uniform gel structure which is required to thicken, or to increase the viscosity of the organic medium. Even where sufficient dispersibility occurs to yield a satisfactory gel structure, small quantities of undispersed particles can be deleterious, such as in paints. Various means have been used to improve the dispersibility of an organoclay in an organic medium including the use of a polar organic material, such as a low molecular weight alcohol or ketone, as a dispersing aid, and the use of an excess of a specially selected organic cation in the preparation of the organoclay.

It is an object of the present invention to prepare an organoclay which has improved dispersibility as measured by the Hegman Gauge.

It is a further object of this invention to prepare an organoclay which will disperse readily in an organic medium to form a homogeneous gel structure.

SUMMARY OF THE INVENTION

According to the present invention there is provided a process for preparing an organoclay which is readily dispersible in an organic medium, which process comprises:

(a) mixing an aqueous suspension of a clay of the smectite group with a quaternary ammonium compound capable of rendering the smectite group clay organophilic in proportions such that there are present from 75 to 110 milliequivalents of quaternary ammonium cation per 100 g of dry smectite clay;

(b) subjecting the mixture formed in step (a) to mixing at high shear for a time sufficient to dissipate in the mixture at least 100 KJ of energy per kg. of dry solids in the mixture; and (c) dewatering the product of step (b). Preferably, the dewatered product of step (c) is dried and milled.

In step (a) the quaternary ammonium compound is preferably one which can be represented by the general formulae:

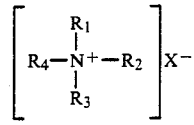

wherein $R_1$ is a saturated or unsaturated alkyl group having from 10 to 24 carbon atoms, $R_2$ and $R_3$, which may be the same or different, are each a saturated or unsaturated alkyl group having from 1 to 24 carbon atoms or an aralkyl group having at least 7 carbon atoms, $R_4$ is an alkyl group having from 1 to 6 carbon atoms or an aralkyl group having at least 7 carbon atoms, and X is OH, Cl, Br, I, $NO_2$, $CH_3SO_4$ or $CH_3.COO$.

Examples of such compounds are the benzyl methyl dialkyl ammonium chlorides, the dimethyl dialkyl ammonium chlorides, the benzyl dimethyl alkyl ammonium chlorides, the benzyl trialkyl ammonium chlorides and the methyl trialkyl ammonium chlorides, where the one or more alkyl group is a mixture of hydrocarbon radicals derived from tallow and having from 14 to 20 carbon atoms but in which $C_{18}$ radicals preferably predominate. (A typical analysis of such a mixture of hydrocarbon radicals contained in tallow is: $C_{14}$ 2.0%; $C_{15}$ 0.5%; $C_{16}$ 19.0%; $C_{17}$ 1.5%; $C_{18}$ 66.0% and $C_{20}$ 1.0%). The hydrocarbon radicals may be partially unsaturated, as in natural tallow, or may be substantially completely saturated as a result of treating the tallow with hydrogen in the presence of a suitable catalyst. For the present invention it has been found particularly advantageous to use a mixture of dimethyl dihydrogenated tallow ammonium chloride and dimethyl benzyl hydrogenated tallow ammonium chloride.

The mixing at high shear is preferably effected by passing the suspension through a homogenizer of the type in which the suspension is forced in the form of a thin film edgewise through a thin, hard-surfaced gap under a pressure of at least 250 pounds per square inch (1.7 MPa) and at high velocity. A suitable homogeniser is described in British Patent Specification No. 987,176 and in U.S. Pat. Nos. 3,039,703 and 3,162,379). Such a homogenizer is manufactured by the Manton-Gaulin Company. Advantageously the homogenizer is operated at a pressure of at least 1500 pounds per square inch (10.5 MPa). The amount of energy E, in KJ per kg. of dry solids, dissipated in the mixture is given by the expression $$E = \frac{nP \cdot 10^3}{w}$$

where P is the pressure in MPa exerted in the Manton-Gaulin (MG) homogenizer, n is the number of passes through the Manton-Gaulin homogenizer, and w is the weight in grams of dry solids in one liter of the aqueous mixture.

The suspension of the clay is mixed with the quaternary ammonium compound in proportions such that there are present from 75 to 110 milliequivalents of quaternary ammonium cation per 100 g of dry clay.

Thus, it has now been found that on an economic basis an advantage exists whereby increased dispersibility can be achieved at lower expense by homogenization of the character described above of lower milliequivalent organoclays (75 to 110 Meq) rather than increasing the Meq levels with excess quaternary ammonium compound which is costly. Further and for a given Meq level upon the organoclay, use of the invention will provide a product with faster dispersion.

As will be shown in the Examples and the figures, post homogenization, as with a Manton-Gaulin mill, of these organoclay slurries, clearly improves dispersibility of the organoclays.

DETAILED DESCRIPTION

Figure 1:
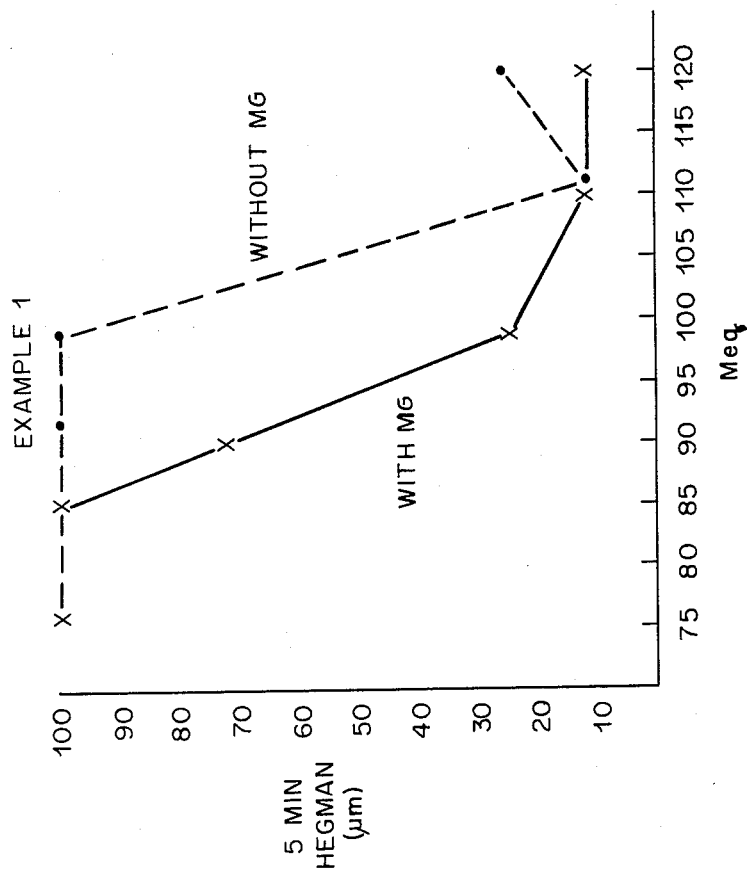
FIGS. 1 and 2 are graphs which illustrate, respectively for Examples 1 and 2, the relationship between Meq and the five minute Hegman grind gauge readings of the organoclays with and without treatment in a Manton-Gaulin homogenizer.
Figure 2:
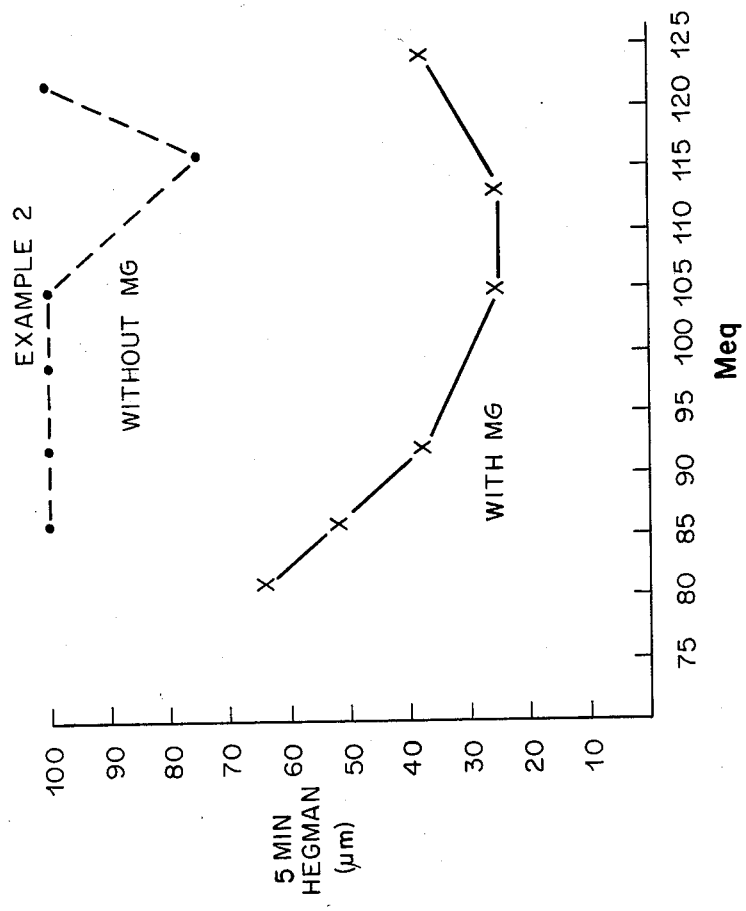

The invention is illustrated by the following Examples.

EXAMPLE I

Organoclay samples were prepared by the following method.

Crude Wyoming sodium bentonite was mixed using a Cowles dissolver for one hour with sufficient water to form a bentonite/water suspension of 8.0 wt. % solids. After allowing it to stand for a period of sixteen hours, the suspension was passed through a No. 200 USA Standard Testing Sieve (aperture 0.075 mm). The undersize fraction (approximately 6 wt. % solids) was then subjected to particle size separation using a Delaval nozzle discharge, disc centrifuge at a flow rate of approximately 2.0 liters per minute. The fine fraction (approximately 4 wt. % solids) was then passed through a Manton-Gaulin homogenizer at a pressure of 4000 psi (27.6 MPa).

In each case, 2,500 g of the clay slurry was heated with the aid of a water bath to 65° C. To the heated slurry was then added the calculated weight of the quaternary ammonium compound and isopropyl alcohol (in which form the quaternary ammonium compounds are available commercially). In this Example, dimethyl dihydrogenated tallow ammonium chloride with a molecular weight of 576.6 and an activity of 74.8% was used. Six organoclays were produced ranging from 76–120 milliequivalents quaternary ammonium cation per 100 g of dry bentonite.

The resultant mixtures were then stirred using a Lightnin Model 20 variable speed mixer for 30 minutes, filtered on a Buchner funnel, washed with hot water and dried in a Blue M forced air oven at 55° C. for sixteen hours. The dry products were then milled using a Fritsch pulversette to a particle size of 98 wt. % passing through a No. 200 USA Standard Testing Sieve (aperture 0.075 mm). This series of six organoclays was designated numbers 1–6.

A second series of six organoclays was prepared using the above procedure with the exception that prior to filtration the reacted organoclay slurries were passed once through the Manton-Gaulin homogenizer at a pressure of 4000 psi (27.6 MPa). All other preparation procedures were as described above. These six organoclays were designated numbers 1A–6A.

The twelve organoclays thus prepared and now designated 1–6 and 1A–6A were then tested for ease of dispersion in a white gloss enamel paint formulation I, shown below. Each organoclay was added to the latter stage of the grind phase after pigment dispersion. Each organoclay was stirred into the paint using a Cowles type blade of 41.28 mm diameter at 5000 rpm for 20 minutes. During the mixing operation small samples were taken on a spatula and spread on a Hegman grind gauge. Hegman grind gauge readings were recorded every 5 minutes.

A large sample of each completely mixed paint was allowed to stand for 24 hours and measurements of the viscosity of the paints at 22° C. were then made using (a) a Brookfield Viscometer spindle 4 at 0.5, 5 and 50 rpm respectively and (b) a Stormer Viscometer—(using 250 g).

In addition, the following other test procedures were conducted: Leneta sag and leveling and Gloss at 20°, 60° and 85° using a Pacific Scientific Gardener Glossometer.

The results obtained are set forth in Tables 1 and 1A.

EXAMPLE 2

Organoclay samples were prepared by the following method.

Crude Wyoming sodium bentonite was mixed using a Cowles dissolver for one hour with sufficient water to form a bentonite/water suspension of 6.0 wt. % solids. After allowing it to stand for a period of sixteen hours the suspension was passed through a No. 200 USA Standard Testing Sieve (aperture 0.075 mm). The undersize fraction (approximately 4.5 wt. % solids) was then subjected to particle size separation using a Delaval nozzle discharge, disc centrifuge at a flow rate of 2.0 liters per minute. To this fine fraction which is approximately 3.0 wt. % solids, was added 2.0% by weight based upon the dry weight of bentonite of sodium carbonates, a sodium exchange salt. The fine fraction was then passed through the Manton-Gaulin homogenizer three times at 4000 psi (27.6 MPa).

In each case, 2500 g of the clay slurry was heated with the aid of a water bath to 65° C. To the heated slurry was then added a mixture of a quaternary ammonium compound and isopropyl alcohol comprising 87 mole % dimethyl dihydrogenated tallow ammonium chloride and 13 mole % dimethyl benzyl hydrogenated tallow ammonium chloride, the average molecular weight of the blend being 556 with an activity of 75.7%. Six organoclays were produced with a range of milliequivalents of quaternary ammonium cation per 100 g of dry bentonite. The resultant mixtures were then stirred using a Lightnin Model 20 variable speed mixer for 30 minutes, filtered on a Buchner funnel, washed with hot water and dried in a Blue M forced air oven at 55° C. for sixteen hours. The dry product was then milled using a Fritsch pulversette to a particle size of 98.0 wt. % passing through a No. 200 USA Standard Testing Sieve (aperture 0.075 mm). This series of organoclays was designated numbers 7–12.

A second series of six organoclays was prepared using the above procedure with the exception that prior to filtration the reacted organoclays were passed once through the Manton-Gaulin homogenizer at a pressure of 4000 psi (27.6 MPa). All other preparation procedures were as described above. These organoclays were designated numbers 7A–12A.

The twelve organoclays thus prepared and now designated 7–12 and 7A–12A were then tested for ease of dispersion in a white gloss top coat enamel paint formulation II, shown below. Each organoclay was added to the latter stage of the grind phase. During the mixing operation small quantities were taken on a spatula and spread on a Hegman grind gauge. Hegman grind gauge readings were recorded every 5 minutes. This data clearly shows that use of the invention improves the rate of dispersion as measured by the Hegman test, without degrading the other important paint properties tabulated.

A large sample of each completely mixed paint was allowed to stand for 24 hours and measurements of the viscosity of the paints at 22° C. were then made using (a) a Brookfield Viscometer spindle 4 at 0.5, 5 and 50 rpm respectively, and (b) a Stormer Viscometer (using 450 g). In addition the following other test procedures were conducted: Leneta sag and leveling and Gloss at 20°, 60° and 85° using a Pacific Scientific Gardener Glossometer.

The results obtained are set forth in Tables 2 and 2A.

TABLE 1

| | | WITHOUT MG TREATMENT | | | | |
|---|---|---|---|---|---|---|
| ORGANOCLAY SAMPLE | MEQ OF CATION PER 100 g OF CLAY | HEGMAN GAUGE READINGS LARGEST PARTICLES (MICROMETERS) INCLUDING NUMBER OF SPECKS (IN PARENTHESES) | | | | |
| | | 5 MIN. | 10 MIN. | 15 MIN. | 20 MIN. | 24 HRS. |
| 1 | 77 | >100 | >100 | 75(>10) | 75(>10) | 50(>10) |
| 2 | 85 | >100 | >100 | 50(>10) | 50(>10) | 38(>10) |
| 3 | 92 | >100 | 50(>10) | 25(>10) | 25(>10) | 20(>10) |
| 4 | 99 | >100 | 12(>10) | 12(5) | 12(5) | 20 |
| 5 | 111 | 12(>10) | 12(3) | 12(5) | 12(5) | 12(5) |
| 6 | 120 | 25(>10) | 12(>10) | 12(5) | 12(5) | 12(5) |

| ORGANOCLAY SAMPLE | 24 HOUR .5 | BROOKFIELD 5 | VISCOSITY (rpm) 50 rpm | STORMER KU | SAG/LEVELING LENETA (MLS) | GLOSS | | |
|---|---|---|---|---|---|---|---|---|
| | | | | | | 20° | 60° | 85° |
| 1 | 16000 | 4000 | 1544 | 87 | 10/3 | 50.0 | 85.1 | 91.0 |
| 2 | 18000 | 4240 | 1600 | 90 | 10/3 | 46.5 | 87.1 | 91.5 |
| 3 | 21600 | 5200 | 1960 | 92 | 12/2 | 48.7 | 88.0 | 92.0 |
| 4 | 22000 | 4800 | 1590 | 91 | 12/2 | 40.3 | 84.7 | 90.8 |
| 5 | 20000 | 4400 | 1460 | 90 | 12/1 | 46.6 | 86.9 | 92.6 |
| 6 | 18000 | 3800 | 1260 | 90 | 12/3 | 42.4 | 85.6 | 91.3 |

TABLE 1A

| | | WITH MG TREATMENT | | | | |
|---|---|---|---|---|---|---|
| ORGANOCLAY SAMPLE | MEQ OF CATION PER 100 g OF CLAY | HEGMAN GAUGE READINGS LARGEST PARTICLES (MICROMETERS) INCLUDING NUMBER OF SPECKS (IN PARENTHESES) | | | | |
| | | 5 MIN. | 10 MIN. | 15 MIN. | 20 MIN. | 24 HRS. |
| 1A | 76 | 100 | 88 | 50(>10) | 25(>10) | 25(>10) |
| 2A | 85 | 100 | 100 | 38(>10) | 12(5) | 12(10) |
| 3A | 90 | 72(>10) | 25(>10) | 12(>10) | 12(5) | 12(10) |
| 4A | 99 | 25(>10) | 12(>10) | 12(5) | 12(5) | 12(5) |
| 5A | 110 | 12(>10) | 12 | 12(5) | 12(5) | 12(5) |
| 6A | 120 | 12(>10) | 12(5) | 12(5) | 12(5) | 12(5) |

| ORGANOCLAY SAMPLE | 24 HOUR .5 | BROOKFIELD 5 | VISCOSITY (rpm) 50 rpm | STORMER KU | SAG/LEVELING LENETA (MLS) | GLOSS | | |
|---|---|---|---|---|---|---|---|---|
| | | | | | | 20° | 60° | 85° |
| 1A | 11600 | 2960 | 1060 | 87 | 9/4 | 44.6 | 86.4 | 91.5 |
| 2A | 17200 | 3920 | 1336 | 89 | 12/3 | 46.1 | 87.9 | 90.0 |
| 3A | 14000 | 3600 | 1200 | 87 | 10/3 | 45.0 | 87.2 | 91.3 |
| 4A | 22400 | 5440 | 2004 | 92 | 12/1 | 45.9 | 87.0 | 93.3 |
| 5A | 32000 | 8200 | 2972 | 103 | 12/1 | 48.9 | 89.0 | 94.0 |
| 6A | 20400 | 5040 | 1700 | 91 | 12/2 | 48.2 | 88.0 | 92.6 |

TABLE 2

| | | WITHOUT MG TREATMENT | | | | |
|---|---|---|---|---|---|---|
| ORGANOCLAY SAMPLE | MEQ OF CATION PER 100 g OF CLAY | HEGMAN GAUGE READINGS LARGEST PARTICLES (MICROMETERS) INCLUDING NUMBER OF SPECKS (IN PARENTHESES) | | | | |
| | | 5 MIN. | 10 MIN. | 15 MIN. | 20 MIN. | 24 HRS. |
| 7 | 86 | >100 | >100 | >100 | >100 | 64(>10) |
| 8 | 92 | >100 | >100 | 75(>10) | 75(>10) | 64 |
| 9 | 99 | >100 | 64(>10) | 64(>10) | 64(>10) | 44 |
| 10 | 105 | >100 | 85 | 48(>10) | 48(>10) | 48(5) |
| 11 | 116 | 75(>10) | 38(5) | 25(>10) | 25 | 25(5) |
| 12 | 122 | 100 | 38(>10) | 25(5) | 12(>10) | 12(5) |

| ORGANOCLAY SAMPLE | 24 HOUR .5 | BROOKFIELD 5 | VISCOSITY (rpm) 50 rpm | STORMER KU | SAG/LEVELING LENETA (MLS) | GLOSS | | |
|---|---|---|---|---|---|---|---|---|
| | | | | | | 20° | 60° | 85° |
| 7 | 12000 | 4640 | 2644 | 106 | 8/4 | 67.1 | 90.5 | 95.3 |
| 8 | 15600 | 5480 | 2836 | 107 | 10/3 | 67.0 | 91.3 | 95.2 |
| 9 | 12000 | 4560 | 2512 | 105 | 9/4 | 66.7 | 92.2 | 96.2 |
| 10 | 20000 | 5920 | 2688 | 111 | 12/3 | 64.3 | 90.6 | 96.5 |
| 11 | 18400 | 4880 | 2048 | 105 | 12/3 | 64.8 | 91.4 | 96.8 |

TABLE 2-continued

| | | | WITHOUT MG TREATMENT | | | | | |
|---|---|---|---|---|---|---|---|---|
| 12 | 20000 | 5680 | 2380 | 108 | 12/3 | 67.9 | 91.7 | 96.5 |

TABLE 2A

WITH MG TREATMENT

| ORGANOCLAY SAMPLE | MEQ OF CATION PER 100 g OF CLAY | HEGMAN GAUGE READINGS LARGEST PARTICLES (MICROMETERS) INCLUDING NUMBER OF SPECKS (IN PARENTHESES) | | | | |
|---|---|---|---|---|---|---|
| | | 5 MIN. | 10 MIN. | 15 MIN. | 20 MIN. | 24 HRS. |
| 7A | 81 | 64(>10) | 64(>10) | 38(>10) | 38(>10) | 25 |
| 8A | 86 | 52(>10) | 52(>10) | 52(>10) | 38(>10) | 25 |
| 9A | 92 | 38(>10) | 38(>10) | 25(>10) | 25(>10) | 12(>10) |
| 10A | 105 | 25(>10) | 12(5) | 12(5) | 12(5) | 12(5) |
| 11A | 113 | 25(5) | 25(5) | 25(5) | 12(5) | 12(5) |
| 12A | 124 | 38(>10) | 25(5) | 25(5) | 12(3) | |

| ORGANOCLAY SAMPLE | 24 HOUR .5 | BROOKFIELD 5 | VISCOSITY (rpm) 50 rpm | STORMER KU | SAG/LEVELING LANETA (MLS) | GLOSS | | |
|---|---|---|---|---|---|---|---|---|
| | | | | | | 20° | 60° | 85° |
| 7A | 9600 | 4160 | 2456 | 108 | 8/4 | 74.5 | 98.0 | 98.0 |
| 8A | 10400 | 4280 | 2460 | 107 | 8/5 | 74.8 | 99.2 | 99.2 |
| 9A | 13600 | 5040 | 2716 | 109 | 9/4 | 73.0 | 97.5 | 97.5 |
| 10A | 18400 | 5200 | 2144 | 108 | 12/3 | 65.0 | 97.0 | 97.1 |
| 11A | 20400 | 5640 | 2344 | 109 | 12/3 | 67.2 | 97.3 | 97.3 |
| 12A | 17200 | 5200 | 2600 | 107 | 12/3 | 63.4 | 96.5 | 96.5 |

Formulation I
WHITE GLOSS ENAMEL

| INGREDIENTS IN ORDER OF ADDITION | DESCRIPTION/FUNCTION | SUPPLIER | GRAMS |
|---|---|---|---|
| BASE: | | | |
| Medium Oil Alkyd (11-070) | 50 wt. % solution of medium oil alkyd resin and Rule 66 Mineral Spirits | Reichhold Chemicals | 106 g |
| Rule 66 Mineral Spirits | Solvent | Union 67 | 10 g |
| Raybo HS57 Optisperse | Dispersant | Raybo | 4 g |
| CR 822 TiO$_2$ | Pigment | Tronox | 130 g |
| High speed dispersed at 7000 rpm using a Dispersmat for 20 minutes | | | |
| Medium Oil Alkyd | As above | As above | 30 g |
| Rule 66 Mineral Spirits | As above | As above | 30 g |
| Stirred at moderate speed for 5 mins. | | | |
| Organoclay | Thixotrope | — | 3 g |
| Methanol/H$_2$O(95.5) | Polar Activator | Alrich Chemicals | 1 g |
| Dispersed at 5000 rpm using a Dispersmat for 20 minutes | | | |
| LET DOWN: | | | |
| Medium Oil Alkyd | As above | As above | 50 g |
| Rule 66 Mineral Spirits | As above | As above | 30 g |
| Cobalt Drier (6%) | Film drier | Interstab | 0.7 g |
| Zirconium Drier (6%) | Film drier | Interstab | 1.4 g |
| Calcium Drier (5%) | Film drier | Interstab | 2.5 g |
| Anti Skinning Agent | Prevent skin formation | Interstab | 0.4 g |

Formulation II
WHITE GLOSS TOP COAT ENAMEL

| INGREDIENTS IN ORDER OF ADDITION | DESCRIPTION/FUNCTION | SUPPLIER | GRAMS |
|---|---|---|---|
| BASE: | | | |
| Marine Oil Alkyd (1560M-50) | 50% solution of Marine Oil Alkyd and Rule 66 Mineral Spirits | Spencer Kellog | 116.6 g |
| G-Solve | Solvent | Union 67 | 10 g |
| Raybo HS57 Optisperse | Dispersant | Raybo | 4.8 g |

| Formulation II WHITE GLOSS TOP COAT ENAMEL -continued | | | |
|---|---|---|---|
| INGREDIENTS IN ORDER OF ADDITION | DESCRIPTION/FUNCTION | SUPPLIER | GRAMS |
| CR 822 TiO$_2$ | Pigment | Tronox | 130 g |
| High speed dispersed at 7000 rpm using a Dispersmat for 20 minutes | | | |
| Marine Oil Alkyd | As above | As above | 32 g |
| Xylene | Solvent | Aldrich Chemicals | 32 g |
| Stirred at moderate speed for 5 minutes | | | |
| Organoclay | Thixotrope | — | 3 g |
| Methanol/H$_2$O(95:5) | Polar Activator | Aldrich Chemicals | 1 g |
| Dispersed at 5000 rpm using a Dispersmat for 20 minutes | | | |
| LET DOWN: | | | |
| Marine Oil Alkyd | As above | As above | 138 g |
| Hi Flash Naphtha | Solvent | Chem Central | 26 g |
| Lead Drier (24%) | Film drier | Interstab | 1.6 g |
| Cobalt Drier (6%) | Film drier | Interstab | 0.64 g |
| Anti Skinning Agent | Prevent Skin Formation | Interstab | 0.64 g |

What is claimed is:

1. A process for preparing an organoclay which is readily dispersible in an organic medium, which process comprises:
    (a) mixing an aqueous suspension of a smectite clay with a quaternary ammonium compound capable of rendering the smectite clay organophilic in proportions such that there are present from 75 to 110 milliequivalents of quaternary ammonium cation per 100 g of dry smectite clay;
    (b) subjecting the mixture formed in step (a) to high shear mixing for a time sufficient to dissipate in the mixture at least 100 KJ of energy per kg. of dry solids in the mixture; and
    (c) dewatering the product of step (b).

2. A process according to claim 1, wherein the dewatered product of step (c) is dried and milled.

3. A process according to claim 1, wherein the quaternary ammonium compound can be represented by the general formula:

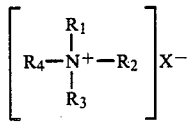

wherein R$_1$ is selected from saturated and unsaturated alkyl groups having from 10 to 24 carbon atoms, R$_2$ and R$_3$, which may be the same or different, are each selected from saturated and unsaturated alkyl groups having from 1 to 24 carbon atoms and aralkyl groups having at least 7 carbon atoms, R$_4$ is selected from alkyl groups having from 1 to 6 carbon atoms and aralkyl groups having at least 7 carbon atoms, and X is selected from OH, Cl, Br, I, NO$_2$, CH$_3$SO$_4$ and CH$_3$.COO.

4. A process according to claim 3, wherein the quaternary ammonium compound is selected from the group consisting of benzyl methyl dialkyl ammonium chlorides, dimethyl dialkyl ammonium chlorides, benzyl dimethyl alkyl ammonium chlorides, benzyl trialkyl ammonium chlorides and methyl trialkyl ammonium chlorides in which the one or more alkyl group represents a mixture of hydrocarbon radicals derived from tallow having from 14 to 20 carbon atoms.

5. A process according to claim 4 in which there is used a mixture of dimethyl dihydrogenated tallow ammonium chloride and dimethyl benzyl hydrogenated tallow ammonium chloride as quaternary ammonium compounds.

6. A process according to claim 5 in which a mixture of about 87 mole percent dimethyl dihydrogenated tallow ammonium chloride and about 13 mole percent dimethyl benzyl hydrogenated tallow ammonium chloride is used as quaternary ammonium compounds.

7. The organoclay product prepared by the process of claim 1.

8. The organoclay product prepared by the process of claim 5.

9. The organoclay product prepared by the process of claim 6.

* * * * *